United States Patent
Andreas (10) Patent No.: US 12,398,818 B2
(45) Date of Patent: Aug. 26, 2025

(54) THERMAL PRESSURE RELIEF DEVICE (TPRD), GAS PRESSURE TANK AND GAS PRESSURE TANK SYSTEM COMPRISING TPRD AND METHOD FOR THERMAL EXCESS PRESSURE PROTECTION

(71) Applicant: Argo GmbH, Gräfelfing (DE)

(72) Inventor: Jan Andreas, Wesel (DE)

(73) Assignee: Argo GmbH, Wesel (DE)

( * ) Notice: Subject to any disclaimer, the term of this patent is extended or adjusted under 35 U.S.C. 154(b) by 68 days.

(21) Appl. No.: 18/001,226

(22) PCT Filed: Jun. 10, 2021

(86) PCT No.: PCT/EP2021/065627
§ 371 (c)(1),
(2) Date: Dec. 8, 2022

(87) PCT Pub. No.: WO2021/250172
PCT Pub. Date: Dec. 16, 2021

(65) Prior Publication Data
US 2023/0235830 A1     Jul. 27, 2023

(30) Foreign Application Priority Data

Jun. 10, 2020    (DE) ..................... 10 2020 207 261.2

(51) Int. Cl.
*F16K 17/40*     (2006.01)
*F17C 13/04*     (2006.01)
*F17C 13/12*     (2006.01)

(52) U.S. Cl.
CPC .............. *F16K 17/40* (2013.01); *F17C 13/04* (2013.01); *F17C 13/12* (2013.01);
(Continued)

(58) Field of Classification Search
CPC ........ F16K 17/40; F17C 13/12; F17C 13/123; F17C 2250/034; F17C 2250/0478;
(Continued)

(56) References Cited

U.S. PATENT DOCUMENTS 3,618,627 A    11/1971   Wagner
6,382,232 B1 *   5/2002   Portmann ............... F16K 13/06
                                                                                              102/275.1
(Continued)

FOREIGN PATENT DOCUMENTS

DE         38 12 552 C1     11/1989
DE         603 09 339 T2     5/2007
(Continued)

OTHER PUBLICATIONS

Office Action, with English machine translation, dated May 13, 2025, for Japanese Patent Application No. 2022-576836. (6 pages).

*Primary Examiner* — Jerry-Daryl Fletcher
*Assistant Examiner* — Daniel C Comings
(74) *Attorney, Agent, or Firm* — Seed IP Law Group LLP (57) ABSTRACT

A gas pressure tank system is disclosed, and includes at least one gas pressure tank comprising a thermal pressure relief device. The thermal pressure relief device may include a valve unit fluidically connected to the at least one gas pressure tank and including at least one fluid path, by way of which a gas stored in the at least one gas pressure tank can be discharged into an environment. The valve unit may include a locking element which can be moved between an open position, in which the gas can flow through the fluid path, and a closed position, in which no gas can flow through the fluid path. The thermal pressure relief device may include a first trigger means configured to detect heat impact at least at one location of the gas pressure tank system (Continued)

spatially separated from the installation location of the thermal pressure relief device.

23 Claims, 5 Drawing Sheets

(52) U.S. Cl.
CPC .............. *F17C 2203/0619* (2013.01); *F17C 2205/0138* (2013.01); *F17C 2205/0142* (2013.01); *F17C 2205/0332* (2013.01); *F17C 2221/012* (2013.01); *F17C 2250/0439* (2013.01); *F17C 2260/04* (2013.01); *F17C 2270/0178* (2013.01); *F17C 2270/0184* (2013.01)

(58) Field of Classification Search
CPC .......... F17C 2250/0482; F17C 2260/04; F17C 2260/042
See application file for complete search history.

(56) References Cited

U.S. PATENT DOCUMENTS

| | | | |
|---|---|---|---|
| 2010/0276024 A1 | 11/2010 | Iida et al. | |
| 2011/0180551 A1 | 7/2011 | Handa | |
| 2012/0227983 A1* | 9/2012 | Lymberopoulos | E21B 34/10 166/373 |
| 2019/0219187 A1 | 7/2019 | Kunberger et al. | |
| 2019/0250650 A1 | 8/2019 | Hawkins et al. | |
| 2022/0170561 A1* | 6/2022 | Walker | F16K 17/40 |

FOREIGN PATENT DOCUMENTS

| | | |
|---|---|---|
| DE | 10 2010 006 516 A1 | 8/2011 |
| DE | 10 2014 205 712 A1 | 10/2015 |
| DE | 10 2016 218 691 A1 | 6/2017 |
| DE | 10 2016 204 075 A1 | 9/2017 |
| DE | 10 2016 213 288 A1 | 10/2017 |
| DE | 10 2016 008 058 A1 | 1/2018 |
| DE | 10 2016 008 079 A1 | 1/2018 |
| DE | 10 2016 213 088 A1 | 2/2018 |
| DE | 10 2016 215 318 A1 | 2/2018 |
| DE | 10 2017 209 190 A1 | 12/2018 |
| DE | 10 2017 212 491 A1 | 1/2019 |
| DE | 10 2018 000 756 A1 | 1/2019 |
| DE | 10 2017 223 652 A1 | 6/2019 |
| DE | 10 2018 203 183 A1 | 9/2019 |
| DE | 102018207494 A1 | 11/2019 |
| DE | 10 2018 218 425 A1 | 4/2020 |
| DE | 10 2018 131 377 A1 | 6/2020 |
| JP | 2008291891 A | 12/2008 |
| WO | 2012/168606 A1 | 12/2012 |
| WO | 2018/001560 A1 | 1/2018 |
| WO | 2019/101385 A1 | 5/2019 |
| WO | 2019160803 A1 | 8/2019 |

* cited by examiner

THERMAL PRESSURE RELIEF DEVICE (TPRD), GAS PRESSURE TANK AND GAS PRESSURE TANK SYSTEM COMPRISING TPRD AND METHOD FOR THERMAL EXCESS PRESSURE PROTECTION

BACKGROUND

Technical Field

The present disclosure relates to a thermal pressure relief device (TPRD) for a gas pressure tank and/or a gas pressure tank system, a gas pressure tank and a gas pressure tank system, which are each provided with a thermal pressure relief device of the same type, said gas pressure tank or gas pressure tank system preferably being used in fuel supply systems which supply fuel cell systems or applications of fuel cells with fuel, in particular with gaseous hydrogen. The present disclosure moreover relates to a method for thermal excess pressure protection, in particular of a gas pressure tank of the same type.

Description of the Related Art

A pressure relief valve in general is a safety device configured to protect a pressurized vessel or system during an excess pressure event. The same applies to a thermal pressure relief device (TPRD) or a thermal pressure relief valve, with a thermal pressure relief device, contrary to a mere pressure relief valve, becoming active when reaching a predetermined or preset limit temperature in order to protect a pressurized vessel or a pressurized system against excess pressure.

An excess pressure event generally refers to any condition which causes a pressure increase in a vessel or system beyond the specified design pressure or the maximum allowable working pressure (MAWP). In the case of a thermal pressure relief valve, the excess pressure event is one caused by a temperature increase in the environment of the vessel or the system, such as in the case of a fire in a vehicle in which the vessel or the system is installed.

The main purpose of a pressure relief valve is to protect life and property by venting liquid or gas from a vessel or system that is under excess pressure.

Today, there are many electronic, pneumatic and hydraulic systems for controlling fluid system variables such as pressure, temperature and flow. Each of these systems requires an energy source of any kind, such as electricity or compressed air, for its operation. A thermal pressure relief device or thermal pressure relief valve must be functional at any time, in particular also in the case of a power failure, for example if the system controller is not functional. Thus, the safest energy source for a pressure relief valve, in particular a thermal pressure relief device, is the process fluid. In other words, the fluid stored in the vessel or system can be a gas or a liquid.

If a state occurs which causes the pressure in a system or vessel to rise to a dangerous level due to the ambient temperature, or if the integrity of the vessel or system is compromised due to the ambient temperature, such as in the case of a fire in a vehicle as described above, the thermal pressure relief device can be the only remaining device in order to prevent a disastrous failure. Since the reliability of the thermal pressure relief device is directly related to the complexity of the device, it is important that the construction of the thermal pressure relief device is as simple as possible.

Various types of thermal relief devices are known; for example, a fitting is used which includes a fusible plug that blocks and seals an outlet passage in the vessel. When the temperature surrounding the vessel now reaches the yield point of the fusible plug, the plug fuses and the pressure forces the fused plug out through the passage in order to thus allow the pressure in the vessel to escape.

For example, DE 603 09 339 T2 proposes a relief valve which provides pressure relief for a pressurized fluid in a vessel when a predetermined temperature or a predetermined pressure is exceeded. The described heat and pressure relief combination valve comprises a first housing having an opening at a first end and a pipe extending through the opening from a second end of the first housing, a second housing partially accommodated in the opening of the first housing, the first and second housings defining a chamber adjacent to the pipe, an exit pipe extending from the chamber and providing an exit to an exterior of the valve, a bearing member within the chamber and adjacent to the pipe, the bearing member being larger than the width of the pipe, a spring pretensioned within the chamber and aligned with the bearing member, and a heat element within the chamber between the second housing and the spring, the heat element being aligned with the spring and fusing at a predetermined temperature, the heat element not blocking an exit to an exterior of the valve when the valve is not actuated, the spring being pretensioned against the heat element when the valve is not actuated and exerts a force on the bearing member such that the bearing member is pretensioned against the pipe and forms a seal between the chamber and the pipe.

In addition, DE 38 12 552 C1 describes a fusion safety device for hydropneumatic pressure tanks, comprising an outlet channel which can be vacated for discharge of the gas from the system and which can be tightly closed by a blocking element made of a material that fuses at a predetermined temperature and thus vacates the outlet channel, wherein, apart from the blocking element, a valve is provided for vacating and tightly closing the outlet channel, which is pretensioned into its blocking position closing the outlet and which can be switched, by an actuation movement of an actuator that can be moved by power drive, into the open position vacating the outlet channel, and the blocking element is configured as a blocking member protruding in the movement path of the actuator and preventing its actuation movement.

Moreover, U.S. Pat. No. 3,618,627 describes an automatic pressure release valve comprising a valve disposed between a pressure system and the environment, the valve having a stem which is at least partially hollow, a fusible element, the fusible element being able to release the pressure system when reaching the fusion temperature, the fusion element being disposed in the hollow valve stem, the fusion element being configured to slide in the hollow and to respond to pressure within the system in order to relieve the system at a predetermined pressure, and a spring being disposed in the hollow and pushing against the fusion element in order to suppress sliding of the fusion element.

In certain cases of application, such as in aviation, the decision to actively activate the thermal pressure relief device (TPRD) may have to be made by a superior entity. However, this is not possible with the devices described above and requires constructive changes.

Furthermore, with the devices described, which use a fusion element in order to activate the thermal pressure relief device, there is the problem that the fusion elements used are not suitable for a pressure range of several hundred bar and thus in the course of time, in particular due to changing stress, begin to flow, which is why the functional capability of the thermal pressure relief device cannot be ensured.

Moreover, in the development of vehicles or means of transport, in particular in passenger automobiles, which use gaseous fuel as energy storage, there has been a recent trend away from the previously established design with one pressure vessel towards several pressure vessels, in particular high-pressure vessel units, which comprise a plurality of individual pressure vessels in order to be able to store sufficient fuel or fuel gas, in particular hydrogen, which is necessary to ensure a satisfactory range of the vehicle.

However, such high-pressure vessel concentrations or high-pressure vessel units have a plurality of possible interfaces or weak points, at which the risk of a possible fire is increased. Thus, the situation can arise that a single high-pressure vessel of the high pressure vessel unit is subjected to a fire or a heat source, whereas the remaining group, in particular the thermal pressure relief device provided at the high-pressure vessel unit, is not affected or impaired. This can have the effect that the high-pressure vessel concerned reaches a critical or unstable state, without it being possible for the thermal pressure relief device to detect this, which can compromise the integrity of the high pressure vessel unit. The same problem can occur in tank farms or tankers which are used for the transport of gaseous fuel or fuel gas, in particular gaseous hydrogen, and which comprise a plurality of high-pressure vessels for this purpose.

BRIEF SUMMARY

Against the background of the prior art described above, it is an object of the present disclosure to provide a thermal pressure relief device as well as a method for thermal excess pressure protection, which are firstly able to improve the reliability in the detection of possible local or spot-like heat impacts on gas pressure tanks or gas pressure tank systems, with it secondly being possible to increase the fatigue strength of the thermal pressure relief device used, in particular in view of the raised requirement profile when storing gaseous hydrogen, while at the same time realizing a simple structure of the thermal pressure relief device.

The aforementioned objects are solved by a thermal pressure relief device according to claim 1, a gas pressure tank according to claim 23, a gas pressure tank system according to claim 25, and a method for thermal excess pressure protection according to claim 26. Preferred further developments of the disclosure are specified in the dependent claims, and the subject matter of the claims relating to the thermal pressure relief device can be used in the context of the gas pressure tank, the gas pressure tank system and the method for thermal excess pressure protection, and vice versa.

Here, it is one of the basic ideas of the present disclosure to provide a thermal pressure relief device as well as a method for thermal excess pressure protection, which are able to detect heat impact on a gas pressure tank and/or a gas pressure tank system not only at the location at which the thermal pressure relief device is mounted or installed at the gas pressure tank and/or the gas pressure tank system, but to be able to detect it at least at one further location on the gas pressure tank and/or the gas pressure tank system and/or a vehicle in which the thermal pressure relief device is installed, and/or to be able to detect heat impact on the gas pressure tank and/or the gas pressure tank system at least at two spatially separated locations or positions or areas, in particular of the gas pressure tank and/or the gas pressure tank system and/or a vehicle in which the thermal pressure relief device is installed.

According to one aspect of the present disclosure, a thermal pressure relief device for gas pressure tanks and/or gas pressure tank systems comprises: a valve unit which can be fluidically connected to a gas pressure tank and/or a gas pressure tank system and comprises at least one fluid path, by means of which the gas pressure tank and/or the gas pressure tank system can be drained, in particular a gas stored under (high) pressure in the gas pressure tank and/or the gas pressure tank system can be discharged or dispensed into an environment, in particular an environment of the gas pressure tank and/or the gas pressure tank system, wherein the valve unit comprises a locking element which can be shifted and/or moved between an open position, in which the gas can flow through the fluid path, in particular outwards into the environment, and a closed position, in which no gas can flow through the fluid path, and a first trigger means configured to shift and/or move, due to heat impact, in particular when reaching a predetermined temperature, the locking element into the open position and/or to enable the locking element to shift and/or move into the open position, wherein the first trigger means is further configured to be able to detect heat impact at least at one further location of the gas pressure tank and/or the gas pressure tank system and/or a vehicle in which the thermal pressure relief device is installed, which is not the installation location of the thermal pressure relief device, and/or to be able to detect heat impact at least at two spatially separated locations and/or areas, in particular of the gas pressure tank and/or the gas pressure tank system and/or a vehicle in which the thermal pressure relief device is installed.

In other words, the thermal pressure relief device comprises two detection areas at which the impact of heat on a single gas pressure tank and/or a group of gas pressure tanks (gas pressure tank system) can be detected. Compared to the known devices, this has the advantage that the heat impact cannot only be detected at the installation location of the thermal pressure relief device, but that this is also possible at least at one further location or position or area.

In this way, a thermal pressure relief device as well as a method for thermal excess pressure protection can be provided, which are firstly able to improve the reliability in the detection of possible local or spot-like heat impacts on gas pressure tanks or gas pressure tank systems, such as spot-like fires in a vehicle, while secondly the fatigue strength of the thermal pressure relief device used, particularly of the trigger means, can be increased, in particular in view of the raised requirement profile when storing gaseous hydrogen. Moreover, the proposed device and the method based thereon realize a simple structure, which positively contributes to the reduction of purchase costs as well as operating costs. This is possible in particular since it is not necessary to use a plurality of separate thermal pressure relief devices.

In the context of the present disclosure, "spatially separated locations and/or areas" are understood such that the two detection locations or detection areas are disposed spaced apart from each other at least so far that a meaningful or safe detection by means of a detection location or a detection area could not be ensured. In other words, the two detection locations or detection areas are spaced apart from each other so far that heat conduction between these two areas is not sufficient, so that a safe detection of heat impact in a sufficiently short response time cannot be ensured.

Accordingly, the respective spacing of detection locations or detection areas depends on the respective installation situation. If it is possible that there are many selective or spot-like danger points, it makes sense to provide many detection locations or detection areas, in particular close to each other.

The spatial distance between individual detection locations or detection areas can vary between 100 mm and 1000 mm, depending on the installation situation or the number of danger points.

Moreover, in the context of the present disclosure, the term "heat impact" is to be understood such that a case or a laminated hollow body of the gas pressure tank or a component of the gas pressure tank system or a component of the vehicle in which the thermal pressure relief device is installed is heated at least selectively, which can compromise the integrity of the gas pressure tank or the gas pressure tank system. The at least selective heating can be caused by a fire, for example a fire in a vehicle, or a cable fire. Major danger points in vehicles are, for example, the brakes, the engine, batteries, and the like.

It is preferred that the thermal pressure relief device is configured in the form of an on-tank valve for being attached to the gas pressure tank, in particular a hydrogen tank (hydrogen gas tank), which is preferably configured to supply a fuel cell system with fuel, in particular gaseous hydrogen.

Moreover, it is advantageous if the thermal pressure relief device comprises a connecting piece configured such that it can be screwed into the gas pressure tank, in particular a connecting piece of the gas pressure tank.

Moreover, it is preferred if the thermal pressure relief device according to the disclosure is used in a gas pressure tank system of a vehicle, a gas deposit, a transport vehicle or tanker used for the transport of gaseous fuel or fuel gas, in particular gaseous hydrogen, exchangeable container batteries, and the like.

In the context of the present disclosure, the terms "vehicle" or "means of transport" or other similar terms as used below comprise motor vehicles in general, such as passenger automobiles including sports utility vehicles (SUVs), buses, trucks, various commercial vehicles, water vehicles including various boats and ships, aircraft, aerial drones and the like, hybrid vehicles, electric vehicles, plug-in hybrid electric vehicles, hydrogen vehicles and other alternative vehicles (e.g., fuels gained from resources other than petroleum). As stated herein, a hybrid vehicle is a vehicle with two or more energy sources, for example petrol powered and at the same time electrically driven vehicles.

Moreover, in the context of the present disclosure, the term "fuel" is to be understood as a medium or fluid which serves as energy storage. On the one hand, this can be a fuel whose chemical energy is converted into mechanical energy by combustion in thermal engines, such as internal combustion engines or gas turbines; on the other hand, it can be hydrogen, for example, which continuously performs a chemical reaction in a fuel cell (galvanic cell) and thus generates electric energy or converts the chemical energy into electric energy. However, it is also possible to burn hydrogen in special fuel machines, which is why hydrogen can also be used as fuel. The fuel can be gaseous or liquid. In the meantime, pressure tanks have also been developed, in which hydrogen is stored in both forms, i.e., in gaseous and liquefied form, the so-called hydrogen storage.

Moreover, it is preferred to configure the locking element as a set piston movably mounted or accommodated in the valve unit transversely to the fluid path (flow channel), in particular perpendicularly to the fluid path.

In this way, it can be avoided that the pressure of the fuel stored in the gas pressure tank or the gas pressure tank system, which in the filled state can lie between 300 bar and 1000 bar, acts in the direction of action of the set piston, whereby the necessary clamping forces of the locking element can be considerably reduced and consequently the stress of the locking element and thus of the thermal pressure relief device can be significantly reduced. Thus, the long durability of the thermal pressure relief device can be ensured.

According to a further embodiment, the set piston has an elongated cylindrical piston body, on the outer circumference of which three sealing members are provided spaced apart from each other in the longitudinal direction of the piston body, whereby in the installed state two chambers separated from each other in a gas-tight manner are formed in the valve unit.

Moreover, it is preferred that in the closed position of the set piston the first chamber is fluidically connected to the fluid path and closes it, which is why no gas stored in the gas pressure tank or in the gas pressure tank system can escape into the environment.

On the other hand, in the open position of the set piston the second chamber is fluidically connected to the fluid path and connects it to a relief port via a fluid pipe, whereby the gas stored in the gas pressure tank or in the gas pressure tank system can escape into the environment.

Moreover, it is preferred that the size of the second chamber is increased by a groove radially circumventing on the outer circumference of the piston body in order to ensure a sufficient flow rate/flow of the gas flowing out of the gas pressure tank and/or the gas pressure tank system.

In this context, the locking element can alternatively be configured as a locking piston which is mounted or accommodated in the valve unit so as to be movable in the direction of the fluid path and/or the outflow direction of the gas, in particular within the fluid path.

According to a further embodiment of the present disclosure, the locking piston in the closed position closes a fluid pipe disposed laterally, in particular in the flow direction behind the locking piston, and in the open position releases it, whereby the fluid path is fluidically connected to the fluid pipe and thus can be or is fluidically connected to a relief port, whereby the gas stored in the gas pressure tank or in the gas pressure tank system can escape into the environment.

Moreover, it is advantageous if the thermal pressure relief device comprises a second trigger means (directly) integrated into the valve unit and connected in parallel or in series, in particular fluidically connected in parallel or in series, to the first trigger means.

Moreover, it is preferred if the first trigger means and/or the second trigger means is/are configured in the form of a glass ampoule configured such that it bursts or breaks when reaching the predetermined temperature (trigger temperature).

Moreover, it is advantageous if the first trigger means is configured in the form of a test track which is under a predetermined pressure (a sufficiently high pressure), so that the locking element, by application of this pressure, remains in the closed position until the pressure in the test track, due to the heat impact, in particular at the at least one further location, drops, in particular below a predetermined trigger pressure (when reaching the predetermined temperature), whereby the locking element is released.

In the context of the present disclosure, the term "release" is to be understood such that a mechanism, preferably a mechanical mechanism, is provided which prevents the locking element from being able to move, in particular into the open position. This can be realized in the simplest manner by the shape of the glass ampoule which, due to its bursting when reaching the predetermined temperature, vacates a space into which the locking element, which is preferably pretensioned by a spring, can move in order to thereby vacate the fluid path for the gas.

It is also advantageous if the test track is configured in the form of a hose, in particular a rubber hose, and/or a pipe, in particular a steel pipe, which is filled with a liquid and/or a gas, in particular water, that is under sufficiently high pressure, so that the locking element remains in the closed position until the pressure in the hose and/or the pipe drops due to heat impact, in particular on a detection element. For example, the pressure prevailing in the test track can lie in a range of 5 bar to 20 bar, preferably 8 to 12 bar.

Moreover, it is preferred if the test track comprises a detection element, in particular an opening element, which is configured by: the hose itself which at least partially fuses when reaching the predetermined temperature, selective weak points in the hose which fuse when reaching the predetermined temperature, sealing plugs which are inserted into the hose and/or the pipe and which fuse when reaching the predetermined temperature, and/or glass ampoules which burst or break when reaching the predetermined temperature and open an opening in the hose or in the pipe, whereby the liquid accommodated in the test track under pressure and/or gas can escape and the pressure in the test track thus drops.

The sealing plug can be made of a plastic material, a eutectic material such as a bismuth or tin compound or the like, which has a low fusion point, so that the sealing plug fuses when reaching the predetermined temperature and opens or makes accessible the opening in the hose or in the pipe.

The detection element(s) at the gas pressure tank and/or at the gas pressure tank system and/or in a vehicle in which the thermal pressure relief device is installed is/are preferably positioned at particularly vulnerable locations, so that possible heat impacts such as a fire can be detected fast and reliably.

In this context, it can be particularly advantageous to provide the detection element(s) (locations or areas) at extreme points of the gas pressure tank and/or the gas pressure tank system. If, for example, a gas pressure tank system has ten gas pressure tanks which are accommodated in a frame in a honeycomb- or ring-shaped manner, it is extremely unlikely that the gas pressure tanks lying furthest inside are subjected to heat impact; accordingly, it can be sufficient to provide detection elements only at external points of the frame.

On the other hand, it can be advantageous to provide detection elements (locations or areas) in a vehicle outside the actual gas pressure tank system, in particular in the vicinity of danger points such as brakes, engines, batteries and the like, in order to detect heat impact at an early stage.

Alternatively, the first trigger means can be configured in the form of a test track filled with a medium, in particular with a liquid and/or a gas, the pressure of which, due to heat impact, reaches a value when reaching the predetermined temperature, which is sufficient to (actively) shift and/or move the locking element into the open position. The pressure increase can preferably take place due to an at least partially occurring phase transition.

It is also advantageous if the test track is configured in the form of a hose, in particular a rubber hose, and/or a pipe, in particular a steel pipe, which is at least filled with a liquid which preferably has a low boiling point and which begins to boil when reaching the predetermined temperature, whereby the pressure in the hose or the pipe rises above the predetermined pressure, so that the locking element can be shifted and/or moved into the open position, in particular irreversibly.

In addition, it is preferred that the liquid accommodated in the hose and/or the pipe is water, ethanol, methanol, ethanol mixtures, methanol mixtures, and the like.

Moreover, it is advantageous if the locking element can additionally be actuated electrically and/or electronically, in particular by means of a heating wire and/or a microwave transmitter which can subject the first and/or the second trigger means to heat impact. Alternatively, the locking element can also be actuated directly, for example via a solenoid valve or a piezo element.

According to a further embodiment according to the disclosure, the thermal pressure relief device comprises a communication device, in particular a wireless communication device using infrared, radio, Bluetooth or WLAN (wireless local area network), which is configured to receive control commands from external users, such as an external controller/main controller of a vehicle, an emergency control system that can be operated by the fire department, the police or other emergency responders, in particular for actuating the first and/or the second trigger means and/or the heating wire and/or the microwave transmitter.

Moreover, it is advantageous if the thermal pressure relief device further comprises an orientation detection device configured to detect in space the absolute geometric orientation of the thermal pressure relief device, in particular of the valve unit, more preferably of at least one gas pressure tank connected to the valve unit, wherein the orientation detection device comprises at least one sensor selected from the group of: accelerometer, gyroscope and terrestrial magnetic field sensor.

In this context, it is preferred that the thermal pressure relief device, in particular a control device integrated into it, is configured to select, based on an orientation of the thermal pressure relief device, in particular of the valve unit, determined by the orientation detection device, a relief port, by means of which a draining of the connected gas pressure tank and/or the connected gas pressure tank system in a predetermined, in particular secured, spatial direction is possible.

For this purpose, the thermal relief device, in particular the valve unit, can comprise a plurality of relief ports, which each can be opened or closed by a valve provided, in particular a solenoid valve. At the respective relief ports, relief pipes can be provided in an advantageous manner, which are oriented in different spatial directions in order to discharge the fuel in a desired or advantageous spatial direction in the case of an accident of the vehicle.

The relief pipes are preferably disposed such that the discharged fuel cannot damage any safety-relevant components of the vehicle, in particular of the fuel supply system, and does not prevent access to the vehicle. Experience has shown that, depending on the position of the vehicle which can lie on the side in the case of an accident, for example, a relief pipe is selected which discharges the fuel upwards, i.e., in the vertical direction, so that lateral access to the vehicle is ensured, in particular for rescue teams.

The present disclosure moreover relates to a gas pressure tank with a connecting piece, into which a thermal pressure relief device as described above can be incorporated. Optionally, the thermal pressure relief device, in particular the valve unit, and/or the gas pressure tank is provided with seals in order to position the thermal pressure relief device within the connecting piece of the gas pressure tank in a gas-tight manner.

Gas pressure tanks of the same type are usually configured as hollow bodies formed of a multi-layer laminate, in particular a multi-layer plastic laminate. The laminate made of plastic can preferably be provided with a reinforcing fiber material, for example with carbon fibers or with glass fibers, in order to increase its stability. The connecting piece is incorporated into this laminate and usually provided with an internal thread, into which a counter thread provided at the connecting piece of the thermal pressure relief device can be screwed in order to attach the thermal pressure relief device to the gas pressure tank, preferably therein.

In this context, it is advantageous if the hose and/or liquid pockets connected to the hose and/or the pipe are incorporated into the hollow body.

The present disclosure moreover relates to a gas pressure tank system for storing fuel, in particular gaseous hydrogen, which is preferably configured to supply a fuel cell system with fuel, in particular gaseous hydrogen, comprising: at least one gas pressure tank, preferably the gas pressure tank according to the disclosure as described above, and a thermal pressure relief device, preferably the thermal pressure relief device according to the disclosure as described above.

The present disclosure moreover relates to a method for thermal excess pressure protection of gas pressure tanks and/or gas pressure tank systems by means of a thermal pressure relief device, in particular the thermal pressure relief device according to the disclosure as described above, comprising: opening of a fluid path, by means of which a gas pressure tank and/or a gas pressure tank system can be drained when reaching a predetermined temperature due to heat impact, in particular external heat impact, wherein the heat impact can be detected for opening the fluid path at least at one further location of the gas pressure tank and/or the gas pressure tank system and/or a vehicle in which the thermal pressure relief device is installed, which is not an installation location of the thermal pressure relief device, and/or the heat impact can be detected for opening the fluid path at least at two spatially separated locations or positions and/or areas of the gas pressure tank and/or the gas pressure tank system and/or a vehicle in which the thermal pressure relief device is installed.

Here, it is preferred if the fluid path in an unactuated and/or untriggered state is closed by means of a locking element which can be actively or passively shifted and/or moved from a closed position, in which no gas can flow through the fluid path, into an open position, in which gas can flow through the fluid path.

Moreover, it is advantageous if due to the heat impact, in particular when reaching the predetermined temperature, a first trigger means shifts and/or moves the locking element into the open position and/or enables the locking element to shift and/or move into the open position.

According to a further embodiment of the method according to the disclosure, the first trigger means is configured in the form of a test track which in the unactuated or untriggered state is under a predetermined pressure and exerts this pressure on the locking element such that the latter remains in the closed position until the pressure in the test track, under heat impact, in particular external heat impact, drops, in particular drops below a predetermined trigger pressure when reaching the predetermined temperature, whereby the first trigger means releases the locking element and the latter is shifted and/or moved into the open position, in particular pushed into the open position by a pretensioned spring.

The thermal pressure relief device can be integrated in a gas pressure tank or a gas pressure tank system comprising several gas pressure tanks. Moreover, the thermal pressure relief device can be used for a method for thermal excess pressure protection. Thus, the further features disclosed in connection with the above description of thermal excess pressure protection can also be applied to the gas pressure tank, the gas pressure tank system and the method for thermal excess pressure protection. The same applies vice versa to the gas pressure tank, the gas pressure tank system and the method for thermal excess pressure protection.

BRIEF DESCRIPTION OF THE SEVERAL VIEWS OF THE FIGURES

Further features and advantages of a device, a use and/or a method are apparent from the following description of embodiments with reference to the enclosed drawings. Of these drawings.

DETAILED DESCRIPTION

Identical reference numbers specified in different figures designate identical, corresponding, or functionally similar elements.

Figures 1, 2:
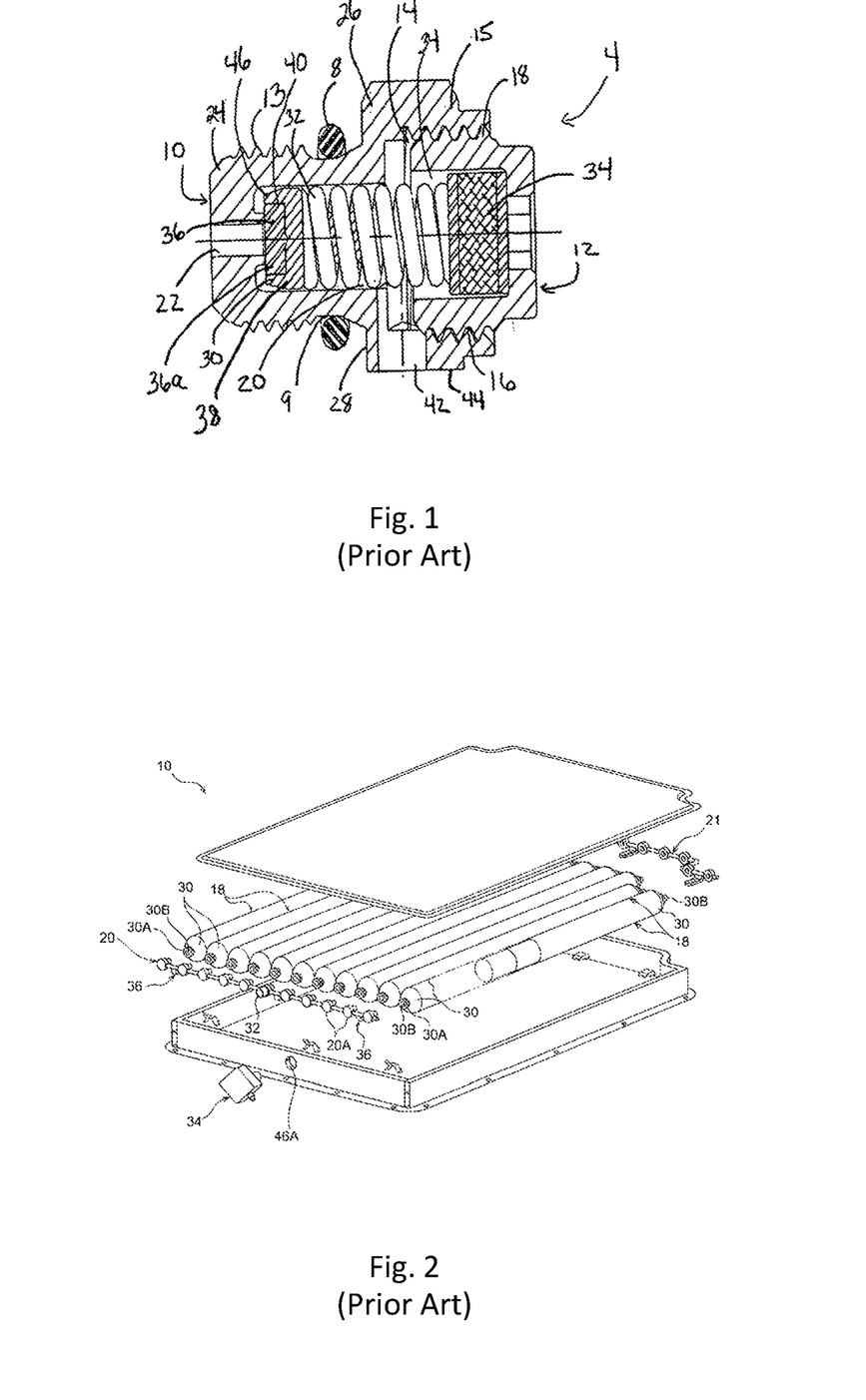
FIG. 1 shows a schematic sectional view of a heat and pressure relief combination valve from the side according to the prior art.
FIG. 2 shows a perspective view of a high-pressure vessel unit according to the prior art, FIG. 3 simplifies an embodiment of a gas pressure tank system according to the disclosure.

FIG. 1 shows a schematic sectional view of a heat and pressure relief combination valve 4 from the side according to the prior art. The valve 4 shown comprises a first housing 10 and a second housing 12. The first housing 10 has a first end 15, a second end 24 opposite the first end, and a pipe 22 extending from a second end 24 of the first housing 10 to the first end 15. The pipe 22 is positioned such that it leads into a distributor 3 and fluidically communicates therewith.

The first and second housings 10, 12 define a chamber 20. The second housing 12 preferably has an opening 34 so that, when the second housing 12 is accommodated by the first housing 10, the openings 14, 34 of the first and second housings together define the chamber 20 adjacent to the pipe 22.

A bearing member 30, a spring 32 and a heat element 34 are disposed in the chamber 20. The bearing member 30 is disposed adjacent to the pipe 22. A part 36 of the bearing member 30 is made of a sealing material disposed adjacent to the pipe 22. The remaining part of the bearing member 30 acts as a bearing surface on which a force is exerted by the spring 22.

It should be noted that the bearing member 30 is formed such that while it acts as a seal against the pipe 22, it does not act as a seal in the chamber 22. Under normal conditions, when the valve 4 is in an unactuated state, the spring 32 is supported under compression against the bearing member 30. Thus, under normal conditions, the spring 32 pretensions the bearing member 30 against the pipe 22. The bearing member thus acts as a seal between the pipe 22 and the chamber 20.

The mode of operation of the valve is now described; as already explained, the valve 4 is integrated into the opening 6 in the distributor 3 which is mounted on the vessel 2 containing a gaseous or liquid fluid. Under normal conditions, the spring 32 is under compression and exerts a force against the bearing member 30 so as to form a seal between the pipe 22 and the chamber 20. Thus, under normal conditions, the spring 32 pretensions the bearing member 30 against the pipe 22. The heat element 34 is disposed aligned with the spring 32.

The heat element 34 has a fusion point which causes it to fuse or lose its solid state properties when a predetermined temperature is reached in the vessel 2. When this occurs, the heat element fuses and causes the spring 32 to decompress into the area previously occupied by the heat element 34. When the spring 32 relaxes, the bearing member 30 is no longer pretensioned against the pipe 22. Thus, it is possible for the excessive heat pressure to pass from the pipe 22 into the chamber 20 and to escape through the exit pipe 42. The valve 4 therefore provides heat relief and prevents damage to the vessel and/or the fluid.

FIG. 2 shows a perspective view of a high-pressure vessel unit 10 according to the prior art. The high-pressure vessel unit 10 shown comprises a box-like housing 22, a plurality of cylindrical vessels 18 lined up inside the housing 22, wherein each vessel 18 has an opening 30B at an end portion on one side in the axial direction, a coupling element 20 which connects the openings 30B so as to couple the plurality of vessels 18 to each other and which contains a flow passage that connects the interiors of the plurality of vessels 18 to communicate with each other. The described high-pressure vessel unit 10 further comprises an outflow pipe 32 which leads from the coupling element 20 through a through hole 46A formed in the housing 22 to the exterior of the housing 22, wherein a valve 34 is connected to the outflow pipe 32, which can open and close the flow passage.

In the shown high-pressure vessel unit 10 according to the prior art, a thermal pressure relief device is only integrated in the valve 34 for cost reasons; accordingly, it is possible here to detect heat impact only outside the housing 22 and only at one location of the high pressure vessel unit 10, which is not satisfactory.

Figure 3:
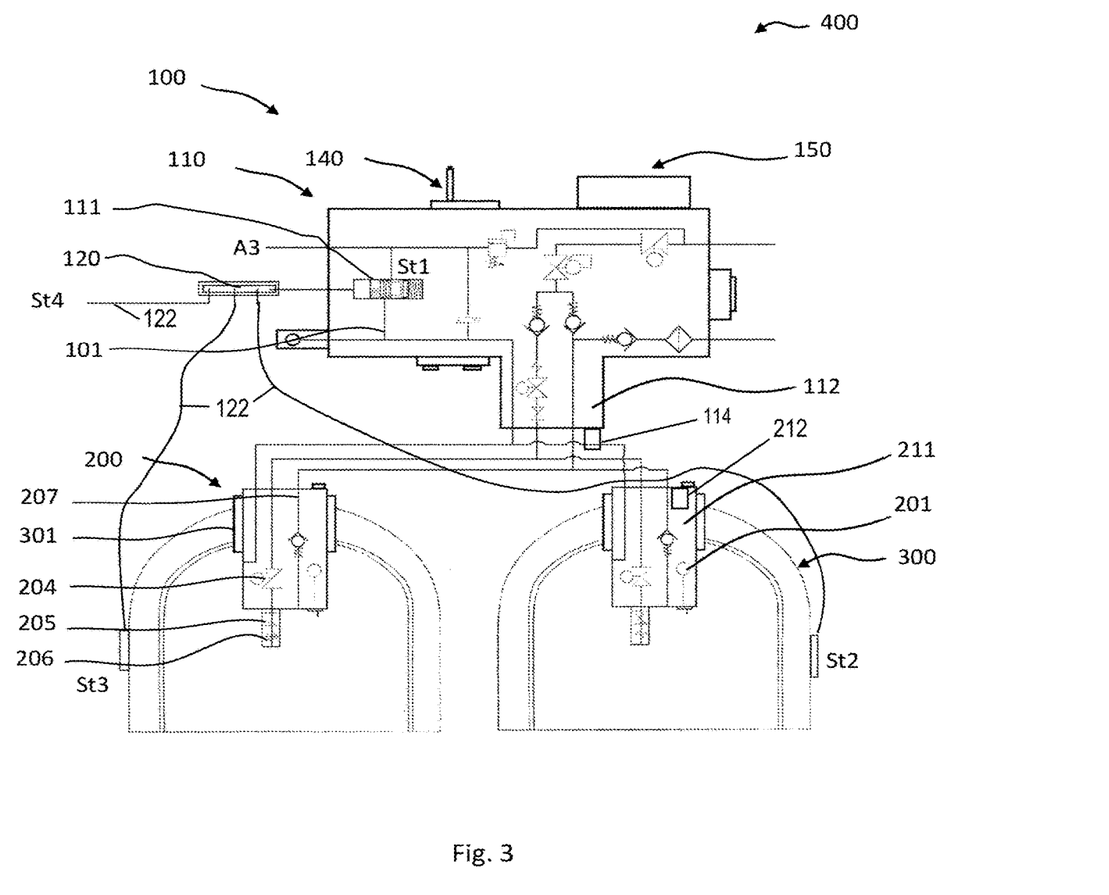

FIG. 3 shows, in a simplified manner, a first embodiment of a gas pressure tank system 400 according to the disclosure, which consists, by way of example, of two gas pressure tanks 300, two on-tank valves 200 which are each screwed into a gas pressure tank 300, and a thermal pressure relief device 100 integrated in a gas handling unit in the embodiment shown. The thermal pressure relief device 100 includes a connecting piece 112 having external threads 114, configured to couple to a connecting piece 211 of the gas pressure tank 300 having internal threads 212. Accordingly, the valve unit 110 of the thermal pressure relief device 100 comprises not only the components necessary for thermal pressure monitoring of the gas pressure tank system 400, but also further components, such as a safety valve, a pressure control valve, filters, check valves, and the like.

As can be seen from FIG. 3, the shown thermal pressure relief device 100 in the valve unit 110 comprises a fluid path 101 which is fluidically connected to or communicates with the two gas pressure tanks (high-pressure vessels) 300, in particular their content, the fuel. A locking element 111 is provided in the fluid path 101, which can open and close the fluid path. In the closed position, which corresponds to the basic position, no gas, in particular fuel, can flow through the fluid path, and thus the gas pressure tanks 300 are in the operational state. However, should a first trigger means 120 of the thermal pressure relief device now detect that heat impact in the form of a fire occurs at the location St2, for example, the trigger means 120 can enable the locking element 111 to move into the open position, whereby the fluid path 101 is connected to the second fluid path 102 (fluid pipe), whereby the gas (the fuel) can be drained or discharged from the gas pressure tanks 300 via a relief port A3 of the valve unit into the environment of the thermal pressure relief device in a controlled manner.

In the embodiment shown, the locking element 111 is configured as a set piston 111a, the function of which will be described in more detail later with reference to FIG. 4. The first trigger means 120 is configured as a test track which here comprises a distributor to which a plurality of hoses and/or pipes 122 can be connected in order to realize the test track. As shown here, two hoses 122 are connected to the distributor, which are each laid to one of the gas pressure tanks in order to be able to detect possible heat impact there at the locations or areas St2 and St3. Moreover, a pipe is connected to the distributor, which leads to the location or the area St4 that can be provided in the engine compartment of a vehicle or in the vicinity of brakes of the vehicle, for example.

In the embodiment shown, the test track is filled with a liquid, preferably water, and pressurized. The pressure prevailing in the test track is led to the set piston 111a which is thereby pushed into the closed position against the force of a spring; in this state, the test track is hermetically or watertightly closed.

If heat impact now occurs at one of the locations St2 to St4, for example a sealing plug formed of plastic in the pipe or in one of the hoses of the test track is fused and the pressurized water can escape, whereby the pressure in the test track or in the first trigger means drops and the spring can thus shift or push the set piston 111a into the open position, whereby the gas can escape through the relief port A3.

Figure 4:
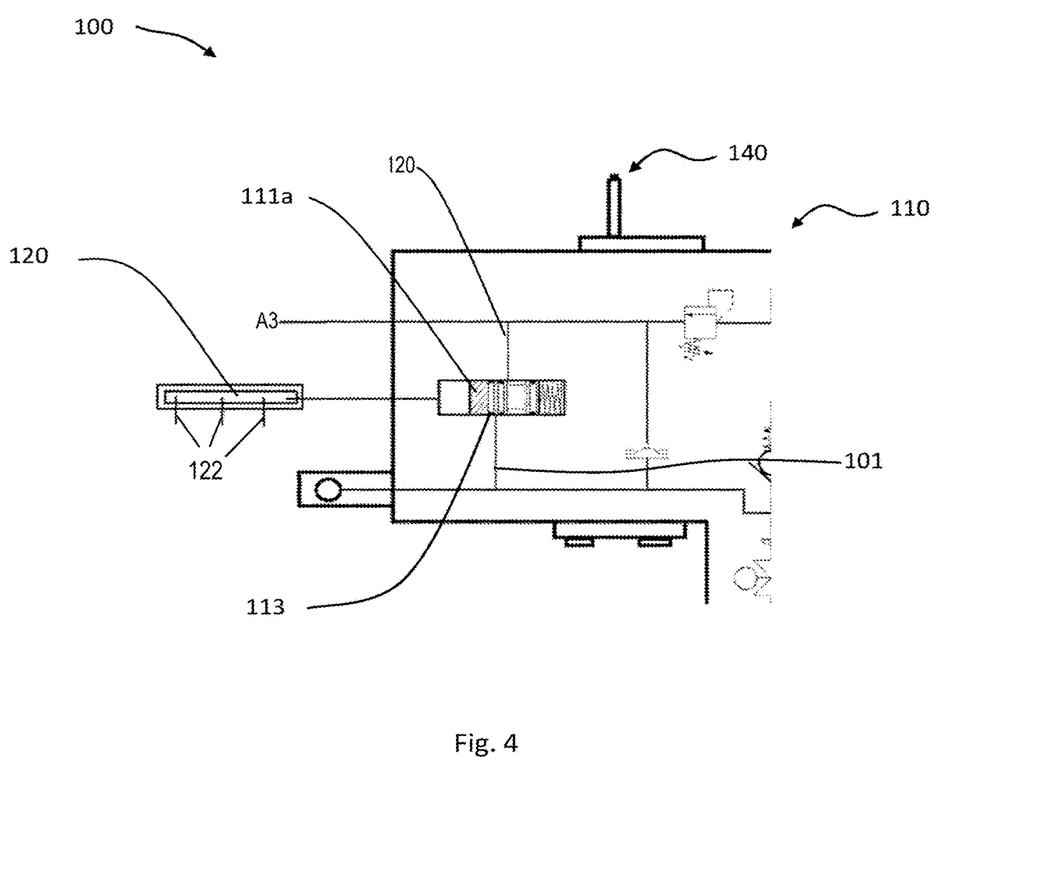
FIG. 4 shows an enlarged section of the thermal pressure relief device of FIG. 3.

FIG. 4 shows an enlarged section of the thermal pressure relief device 100 of FIG. 3. As illustrated in FIG. 4, the set piston 111a is movably mounted in the valve unit 110 transversely to the fluid path 101, in particular movably mounted in the transverse direction (perpendicularly) to the fluid path 101. The set piston 111a has an elongated cylindrical piston body, on the outer circumference of which three sealing members 113 are provided in grooves. The three sealing members 113 are disposed spaced apart from each other in the longitudinal direction of the piston body, i.e., perpendicularly to the fluid path 101, whereby two chambers K1, K2 separated from each other in a gas-tight manner are formed in a guide hole in which the set piston 111a is movably accommodated.

Figure 5:
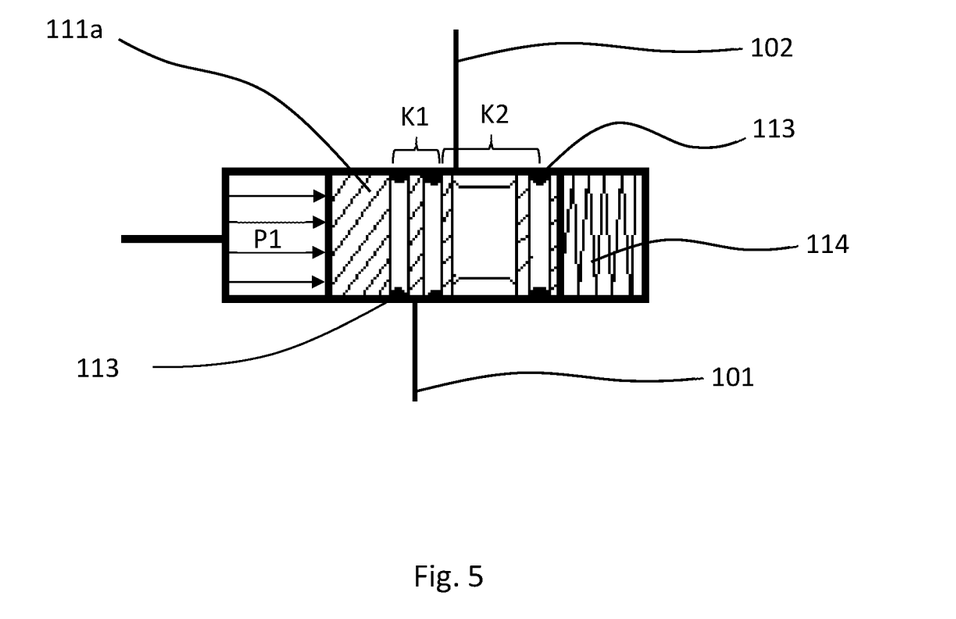
FIG. 5 shows the locking element of the thermal pressure relief device of FIG. 4 in the closed position.

FIG. 5 shows the locking element 111a of the thermal pressure relief device 100 of FIG. 4 in the closed position. As can be seen from FIG. 5, a pressure P1 prevailing in the test track (first trigger means) 120 is applied to the left side of the set piston 111a and pushes the set piston to the right against a spring 114 which is pretensioned thereby. In this position, the fluid path 101 opens into the first chamber K1 which is not connected to the second fluid path 102, which is why the thermal pressure relief device is in the closed state, i.e., in the unactuated state.

Figure 6:
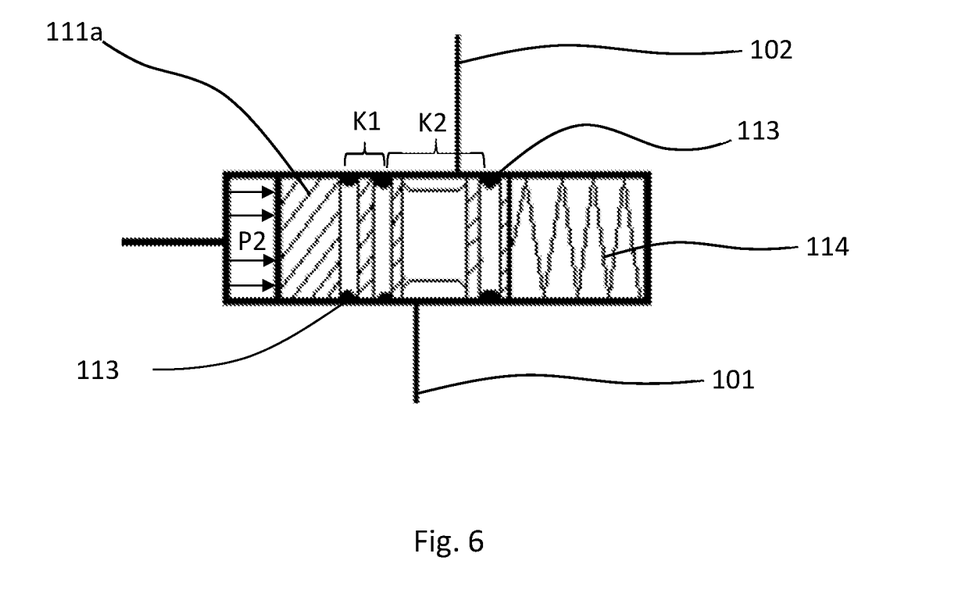
FIG. 6 shows the locking element of the thermal pressure relief device of FIG. 4 in the open position, and FIG. 7 simplifies a further embodiment of a gas pressure tank system according to the disclosure, in particular a thermal pressure relief device according to the disclosure.

FIG. 6 shows the locking element or the set piston 111a of the thermal pressure relief device 100 of FIG. 4 in the open position, i.e., in the actuated state. As can be seen from FIG. 6, the pressure in the test track has dropped to a pressure D2 which is lower than the pressure P1, whereby the pretensioned spring 114 can shift the set piston 111*a* to the left into the open position. In this position, the fluid path 101 opens into the second chamber K2 which is connected to the second fluid path 102, whereby the gas can escape from the gas pressure tank outwards into the environment via the relief port A3. As can further be seen from FIG. 6, a groove is formed or the diameter of the set piston 111*a* is reduced at the location of the chamber K2, i.e., between the two right sealing members 113, in order to ensure a sufficiently high flow rate of the outflowing gas.

Figure 7:
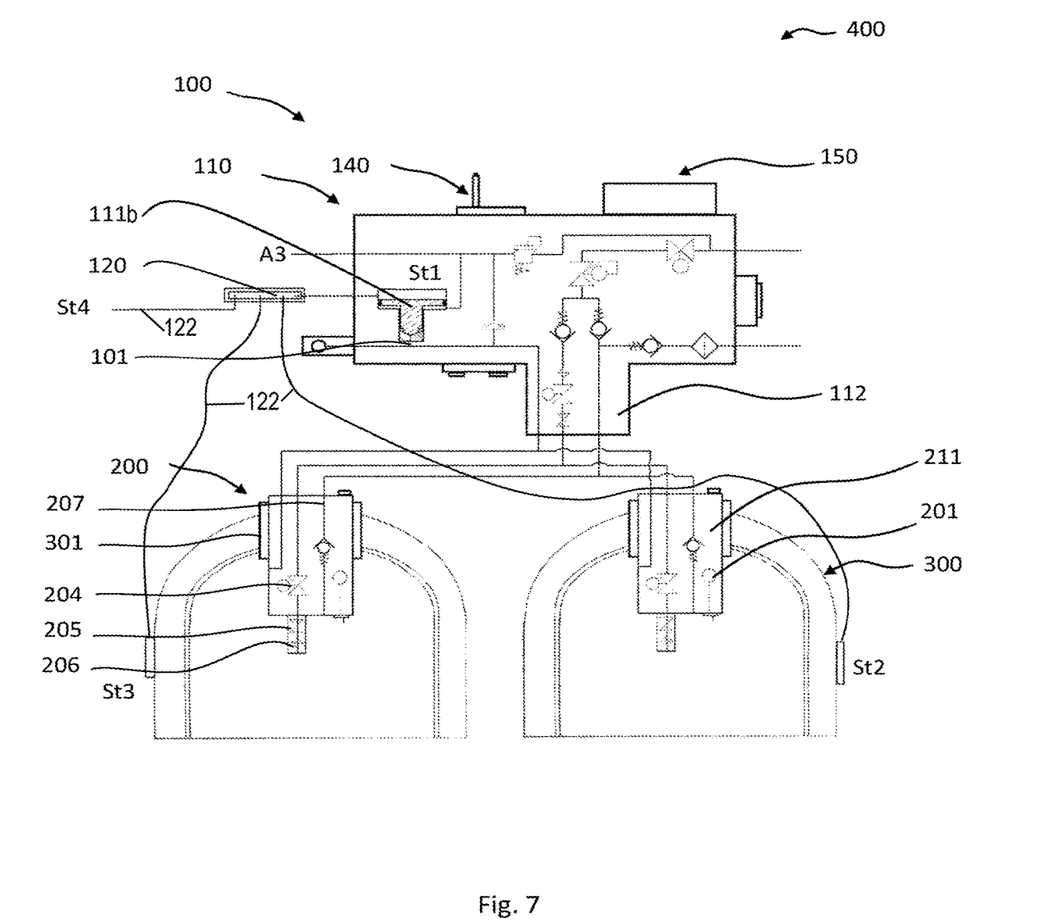

FIG. 7 shows, in a simplified manner, a further embodiment of a gas pressure tank system according to the disclosure, in particular of an alternative thermal pressure relief device according to the present disclosure. In its fundamental structure, the gas pressure tank system shown in FIG. 7 corresponds to the system already described in FIG. 3. In the embodiment shown here, only the locking element 111 is not configured as a set piston 111*a*, but as a locking piston 111*b*.

As can be seen from FIG. 7, the locking piston 111*b* is movably accommodated in the valve unit 110 in the direction of the fluid path 101 or in the direction of the gas flowing out through the fluid path 101. On the side facing the fluid path 101, the locking piston 111*b* has a conical valve body area which in the closed state comes into contact with a valve seat, whereby the thermal pressure relief device 100 is in the closed state. On the side of the locking piston 111*b* facing away from the valve seat, a piston area is formed which is significantly larger than the valve seat area, for example 50 to 100 times as large. In this way, the pressure of 10 to 20 bar prevailing in the test track is sufficient to close the valve against the cylinder pressure of up to 1000 bar applied to the fluid path 101.

If the pressure in the test track now drops due to heat impact, as in the embodiment described above, the pressure acting on the piston area drops and the locking piston 111*b* is shifted upwards by the pressure prevailing in the gas pressure tank and applied to the fluid path 101 and opens the valve, whereby the gas can flow to the relief port A3 via the second fluid path 102. In order to ensure opening of the valve even at a relatively low pressure in the gas pressure tank 300, a spring can be provided which pushes the locking piston 111*b* away from the valve seat if the pressure in the test track drops due to heat impact.

It is apparent to the skilled person that individual features described in different embodiments can also be implemented in a single embodiment, provided they are not structurally incompatible. Likewise, various features described in the context of a single embodiment may also be provided in several embodiments either individually or in any suitable sub-combination.

LIST OF REFERENCE NUMBERS

100 thermal pressure relief device
101 fluid path
102 fluid pipe (second fluid path)
110 valve unit
111 locking element
111*a* set piston
111*b* locking piston
112 connecting piece
114 external threads
113 sealing member(s)
120 first trigger means
122 hoses and/or pipes
121 detection element (opening element)
130 second trigger means
140 communication device
150 orientation detection device
A3 relief port
K1 first chamber
K2 second chamber
St1 installation location
St2 (first) further location
St3 (second) further location
200 on-tank valve
201 temperature and/or pressure detection unit
204 safety valve
205 excess flow valve
206 filter
207 refueling channel
212 internal threads
211 connecting piece
300 gas pressure tank
301 connecting piece
302 temperature sensor
400 gas pressure tank system The present application claims priority to International Patent Application No. PCT/EP2021/065627 filed on Jun. 10, 2021 and German Patent Application No. 10 2020 207 261.2 filed on Jun. 10, 2020, the entire contents of which are incorporated herein by reference, in their entirety.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A gas pressure tank system for storing gaseous hydrogen, which is configured to supply a fuel cell system with gaseous hydrogen, comprising:
   at least one gas pressure tank comprising a connecting piece, and
   a thermal pressure relief device for the gas pressure tank system, wherein the thermal pressure relief device comprises:
      a valve unit which can be fluidically connected to the at least one gas pressure tank and which comprises at least one fluid path, by means of which a gas stored under pressure in the at least one gas pressure tank can be discharged into an environment,
      wherein the valve unit comprises a locking element which can be moved between an open position, in which the gas can flow through the fluid path, and a closed position, in which no gas can flow through the fluid path, and
      a first trigger means configured to move, due to heat impact, when reaching a predetermined temperature, the locking element into the open position and/or to enable the locking element to move into the open position,
      wherein the first trigger means is further configured to be able to detect heat impact at least at one location of the gas pressure tank system spatially separated from the installation location of the thermal pressure relief device, or
      to be able to detect heat impact at least at two spatially separated locations of the at least one gas pressure tank wherein the first trigger means is a test track which is under a predetermined pressure, so that the locking element, by application of this pressure, remains in the closed position until the pressure in the test track, due to the heat impact at the at least one location of the gas pressure tank system spatially separated from the installation location of the thermal pressure relief device, drops, or wherein the first trigger means is configured as a test track extending from the at least one location of the gas pressure tank system spatially separated from the installation location of the thermal pressure relief device to the thermal pressure relief device, the test track filled with a medium, the medium being a liquid or a gas, the pressure of which, due to heat impact, reaches a value when reaching the predetermined temperature, which is sufficient to move the locking element into the open position.

2. The gas pressure tank system according to claim 1, wherein the thermal pressure relief device is an on-tank valve configured to attach to the at least one gas pressure tank.

3. The gas pressure tank system according to claim 2, further comprising a connecting piece configured such that it can be screwed into the at least one gas pressure tank.

4. The gas pressure tank system according to claim 1, wherein the locking element is configured as a set piston movably mounted in the valve unit transversely to the fluid path.

5. The gas pressure tank system according to claim 4, wherein the set piston has an elongated cylindrical piston body, on the outer circumference of which three sealing members are provided spaced apart from each other in the longitudinal direction of the piston body, wherein a first chamber and a second chamber separated from each other in a gas-tight manner are formed in the valve unit by way of the set piston.

6. The gas pressure tank system according to claim 5, wherein in the closed position of the set piston the first chamber is fluidically connected to the fluid path and closes it, in the open position of the set piston the second chamber is fluidically connected to the fluid path and connects it to a relief port via a fluid pipe.

7. The gas pressure tank system according to claim 6, wherein the size of the second chamber is increased by a groove radially circumventing on the outer circumference of the piston body, such that the groove decreases a diameter of the piston body in a portion surrounded by the second chamber.

8. The gas pressure tank system according to claim 1, wherein the locking element is configured as a locking piston mounted in the valve unit so as to be movable in the direction of the fluid path or the outflow direction of the gas.

9. The gas pressure tank system according to claim 8, wherein the locking piston in the closed position closes a laterally disposed fluid pipe and in the open position releases it, whereby the fluid path is fluidically connected to the fluid pipe and thus fluidically connected to a relief port.

10. The gas pressure tank system according to claim 1, further comprising a second trigger means integrated into the valve unit and connected in parallel or in series to the first trigger means.

11. The gas pressure tank system according to claim 10, wherein at least one of the first trigger means and a second trigger means is a glass ampoule, respectively, configured such that it bursts or breaks when reaching the predetermined temperature.

12. The gas pressure tank system according to claim 11, wherein the test track is a hose or a pipe which is filled with a liquid or a gas that is under sufficiently high pressure, so that the locking element remains in the closed position until the pressure in the hose or the pipe drops due to heat impact.

13. The gas pressure tank system according to claim 12, wherein the test track comprises a detection element, the detection element comprising:
the hose or pipe configured to at least partially fuse when reaching the predetermined temperature;
selective weak points in the hose or pipe configured to fuse when reaching the predetermined temperature;
sealing plugs inserted into the hose or configured to fuse when reaching the predetermined temperature; and/or
glass ampoules configured to burst or break when reaching the predetermined temperature, and
wherein the detection element is configured to open an opening in the hose or in the pipe.

14. The gas pressure tank system according to claim 13, wherein the detection element of the gas pressure tank system in which the thermal pressure relief device is installed is positioned at one or more locations most vulnerable to heat impacts.

15. The gas pressure tank system according to claim 12, wherein the at least one gas pressure tank is a hollow body formed of a multi-layer laminate, into which the connecting piece is incorporated, and
wherein a hollow body hose or liquid pockets are incorporated into the hollow body, the a hollow body hose or liquid pocket configured to connect to the hose or the pipe of the first trigger means.

16. The gas pressure tank system according to claim 1, wherein the test track is a hose or, a pipe which is filled with a liquid configured to begin to boil when reaching the predetermined temperature, whereby the pressure in the hose or the pipe rises above a predetermined pressure, so that the locking element can be moved into the open position.

17. The gas pressure tank system according to claim 16, wherein when the hose or the pipe is filled with liquid, the liquid comprises any of water, ethanol, methanol, ethanol mixtures, and methanol mixtures.

18. The gas pressure tank system according to claim 1, wherein the locking element can be moved electrically.

19. The gas pressure tank system according to claim 1, wherein the gas pressure tank system is configured to receive control commands from an external source such that the first trigger means may be actuated by the external source.

20. The gas pressure tank system according to claim 1, further comprising an orientation detection device configured to detect in space the absolute geometric orientation of the valve unit, wherein the orientation detection device comprises at least one sensor selected from the group of: an accelerometer, a gyroscope and a terrestrial magnetic field sensor.

21. The gas pressure tank system according to claim 20, wherein the thermal pressure relief device is configured to select, based on an orientation of the valve unit determined by the orientation detection device, a relief port, by means of which a draining of the at least one connected gas pressure tank in a predetermined, spatial direction is possible.

22. A method for thermal excess pressure protection for gas pressure tank systems by means of a thermal pressure relief device comprising a first trigger means, comprising:

opening of a fluid path, by means of which a gas pressure tank system can be drained when reaching a predetermined temperature due to heat impact, wherein heat impact can be detected for opening the fluid path at least at one location of the gas pressure tank system spatially separated from an installation location of the thermal pressure relief device, or heat impact can be detected for opening the fluid path at least at two spatially separated locations of the gas pressure tank system wherein the first trigger means is a test track which in an unactuated state is under a predetermined pressure and exerts this pressure on a locking element such that the latter remains in the closed position until the pressure in the test track, under heat impact, drops below a predetermined trigger pressure, whereby the first trigger means releases the locking element and the latter is moved into the open position, or wherein the first trigger means is a test track extending from the at least one location of the gas pressure tank system spatially separated from the installation location of the thermal pressure relief device to the thermal pressure relief device, the test track filled with a medium, the medium being a liquid or a gas, the pressure of which, due to heat impact, reaches a value when reaching the predetermined temperature, which is sufficient to move the locking element into the open position.

23. The method for thermal excess pressure protection according to claim 22, wherein the fluid path state is closed by means of a locking element when the test track is in the unactuated state, the locking element configured to be actively or passively moved from a closed position, in which no gas can flow through the fluid path, into an open position, in which gas can flow through the fluid path.

* * * * *